2,996,106
METHOD OF MANUFACTURING INORGANICALLY BONDED MICACEOUS SHEET

Jerome P. McCarthy, Cedar Grove, and Robert Greer, Jr., Paterson, N.J., assignors to Synthetic Mica Corporation, Caldwell Township, N.J., a corporation of New York
No Drawing. Filed Mar. 13, 1957, Ser. No. 645,672
10 Claims. (Cl. 154—2.6)

This invention relates to a method of manufacturing an inorganically bonded micaceous sheet and particularly to a method of manufacturing an inorganically bonded micaceous sheet which is readily shapable and punchable.

The inorganic bonding of micaceous sheets has been known for some time. To manufacture such a product a sheet of natural mica, preferably muscovite, is formed as by a paper making process. The sheet is then organically bonded to hold it together and thereby facilitate handling, and thereafter the sheet is impregnated with an inorganic binder in solution and after impregnation is completed the sheet is pressed at a high temperature to cure the binder.

One of the binders heretofore used in the process just described has been a phosphate in solution. During the curing operation the phosphate is caused to vitrify to thereby provide a phosphate glass binder to firmly hold the mica particles in the sheet. The temperature to which the bonded sheet has heretofore been subjected in order to cure the inorganic binder therein has been sufficiently high to cause complete vitrification of the phosphate in the phosphate solution which had impregnated the sheet. This temperature has also been sufficiently high to burn out the temporary organic binder, thereby leaving the sheet in a state of solely being bonded by the inorganic material. The final product has been highly satisfactory for certain applications. However, phosphate bonded natural mica sheets have exhibited substantial brittleness which obviates the possibility of suitable punching. Moreover, by producing a brittle sheet it has been substantially impossible to use the sheet in other than a planar form.

Recently practical methods have been developed to manufacture synthetic mica and particularly to manufacture synthetic fluor-phlogopite mica. A highly desirable method for manufacturing synthetic fluor-phlogopite mica is disclosed in U.S. Patent No. 2,711,435, granted to Richard A. Humphrey on June 21, 1955, for Electric Furnace and Electric Melting and Crystallizing Method for Minerals. The synthetic fluor-phlogopite mica produced by the Humphrey method has certain advantages over natural muscovite mica. These advantages are high purity and high thermal resistance. Moreover, the synthetic fluor-phlogopite mica is clear and colorless and also has improved electrical resistance and dielectric strength. These advantages flow from the facts that the raw materials used in the making of synthetic fluor-phlogopite mica are of high purity whereby to eliminate the impurities found in all natural micas, which impurities tend to reduce the quality of the electrical properties and to discolor the natural mica. Moreover, and perhaps more important, synthetic fluor-phlogopite mica has far higher thermal resistance because the synthetic fluor-phlogopite molecule has included therein fluorine ions in lieu of the hydroxyl ions found in natural muscovite mica. The presence of the hydroxyl ions in natural muscovite mica sharply reduces the thermal resistance of natural muscovite mica because the water of constitution, i.e., the hydroxyl ions, tends to be driven out of the muscovite mica molecule at relatively low temperatures thereby resulting in exfoliation of the mica which is undesirable. On the other hand, the fluorine ions in the synthetic fluor-phlogopite mica are not driven off at low temperatures but remain in the molecule until much higher temperatures are reached. Accordingly, there is no exfoliation of synthetic fluor-phlogopite mica until it is subjected to much higher temperatures.

With a commercial source of synthetic fluor-phlogopite mica now available, inorganically bonded sheets of synthetic fluor-phlogopite mica can be produced. However, if the methods utilized for inorganically bonding natural mica are employed to bond synthetic fluor-phlogopite mica, the same shortcomings as are found in the final natural mica product are found in the synthetic fluor-phlogopite mica final product. Specifically, the final synthetic mica product is brittle and not readily workable; that is the product is not readily punchable nor is it readily shapable.

It is therefore one object of the present invention to provide a new and improved inorganically bonded micaceous sheet which is workable.

Another object of the present invention is the provision of a new and improved synthetic fluor-phlogopite mica sheet which is punchable and shapable.

Still another object of the present invention is the provision of a new and improved method for inorganically bonding micaceous sheets wherein it becomes unnecessary to preliminarily organically bond said sheet prior to inorganically bonding same.

Another object of the present invention is the provision of a new and improved method for inorganically bonding a synthetic fluor-phlogopite mica sheet so as to render said sheet shapable.

Still another object of the present invention is the provision of a method of inorganically bonding a synthetic mica sheet wherein the sheet produced by the method is readily punchable.

The above and other objects, characteristics and features of the present invention will be more fully understood from the following detailed description.

The basic material for use in the method to be described herein is a reconstituted micaceous sheet and preferably a reconstituted sheet of synthetic fluor-phlogopite mica. Such a sheet is made by laying down a huge multiplicity of small platelets of micaceous material which are held together by cohesion and other natural forces, no binder being employed to hold the platelets together. Such a sheet has relatively low tensile strength and must be handled with care or it will break up. Sheets of the type described above may be made in any one of a number of processes. For instance, such a sheet may be made by breaking up a chunk of synthetic fluor-phlogopite mica made in accordance with the Humphrey process referred to above into a multiplicity of small platelets of synthetic mica, suspending the platelets in a liquid medium such as water, and laying the suspended platelets down in a sheet. One method of so laying the platelets down may be that of conventional paper making apparatus such as a Fourdrinier machine. Another method of fabricating a reconstituted sheet is disclosed in U.S. Patent No. 2,490,129, granted to Moses D. Heyman on December 6, 1949, for Method and Apparatus for Fabricating Mica. For the purposes of the present invention, the method of manufacturing the reconstituted sheet of mica and particularly the reconstituted sheet of synthetic fluor-phlogopite mica is of no critical importance. The only important fact is that the initial material to be worked on be a reconstituted sheet of mica and preferably a reconstituted sheet of synthetic fluor-phlogopite mica.

In accordance with one feature of the present invention, the reconstituted sheet is placed on a supporting means which is preferably in the form of a thin sheet and most preferably in the form of a metallic screen. A stainless steel screen is highly desirable as a support for the reconstituted sheet because the stainless steel will not react with the contemplated binder nor with the mica and by using a screen, binder solution, as will be described in detail hereinafter, will be afforded ready access to the reconstituted sheet. The stainless steel screen is larger than the reconstituted sheet so that it may be gripped. Accordingly, the reconstituted sheet may be moved from place to place merely by gripping opposite ends of the underlying stainless steel screen. Accordingly, no material stress will be placed on the reconstituted sheet during the handling thereof, most of the stress being taken by the underlying supporting screen.

The reason that the stainless steel screen or other thin sheet material is used as a supporting means is due to the fact that the reconstituted sheet has little tensile strength and is apt to break up when handled, particularly after impregnation with the binder solution as will be described hereinafter. By using the screen the reconstituted sheet will not be stressed during handling and will accordingly remain integral. Heretofore this problem has been solved by impregnating the reconstituted sheet with a temporary binder such as an organic binder. Although the use of a temporary binder effectively held the sheet together, it of course was necessary to immerse the reconstituted sheet in the temporary binder and thereafter cure the temporary binder prior to the introduction of the sheet in a permanent binder solution. These necessary steps were relatively time consuming and expensive. By the use of the supporting stainless steel screen they may be eliminated thereby shortening the total time of the process disclosed herein and also making it less expensive. It should be understood that the stainless screen utilized as a support in the present method can be used over and over again thereby obviating necessity of utilizing a large amount of relatively expensive screening to effect this novel step in the present method.

With the reconstituted sheet placed on the stainless steel screen, the screen and the reconstituted sheet disposed thereon are placed in a bath having an inorganic binder solution. Preferably the binder is a phosphate binder in solution and most preferably the binder is a phosphate as found in orthophosphoric acid. As is presently contemplated, the inorganic binder bath is a solution of orthophosphoric acid and a solvent therefor, preferably methyl alcohol. If 100% strength orthophosphoric acid is used, the solution may range from 1 part orthophosphoric acid and 50 parts methyl alcohol to pure 100% strength orthophosphoric acid. The preferred solution for the bath is made up of 1 part of 85% strength orthophosphoric acid and 8 parts methyl alcohol.

The reconstituted synthetic mica sheet, being porous, will quickly absorb as much of the binder solution as possible. After impregnation the sheet may be compressed together with the screen in order to increase the density thereof although compression is not necessary. The sheet may in fact be permitted to stand at room temperature for a sufficient time to permit the phosphate ion to react with the micaceous material. The reaction causes the formation of a cement or gel which holds the micaceous platelets together so that the sheet can be handled without undue danger of becoming broken. The impregnated reconstituted sheet will be tacky and flexible and it may readily be shaped as by placing it in a die and compressing it.

The reaction between the phosphate binder solution and the micaceus platelets has been found to be a time-temperature reaction. This is, the application of heat accelerates the reaction and the longer heat is applied, the farther the reaction progresses. It has also been found that the farther the reaction progresses the stiffer the sheet will be. These statements apply for all temperatures between room temperature and about 1500° F. At this latter temperature, the reaction products appear to undergo vitrification which yields an unworkable, that is unshapable and unpunchable, and brittle sheet similar to products now on the market.

It has been found that to give the sheet an excellent property for shaping after immersion in the bath, the sheet is subjected to temperatures varying from room temperature up to 450° F., and preferably be subjected to temperatures between 250° F. and 300° F. for one to three minutes. The sheet may be subjected to these temperatures while being compressed although, as has been stated hereinbefore, pressure is not necessary. However, when temperatures above 170° F. are used, the application of pressure is desirable to prevent the formation of voids in the sheet due to the formation of gas bubbles therein. It has been found that as the pressure to which the sheet is subjected increases, the density of the sheet increases, the electrical resistance and dielectric strength of the sheet decrease, and thermal insulating properties of the sheet decrease. Preferably the sheet is subjected to 250 pounds per square inch pressure for three minutes. After the sheet has been subjected to the temperature within the range of room temperature to 450° F. and has or has not been compressed, the reaction has proceeded to a point where the sheet is flexible but has sufficient toughness so that it may be shaped into relatively intricate shapes. For instance, it may be wound around a wire coil as an insulator therefor. It may be stamped into three dimensional shapes and other three dimensional forms may be achieved.

To make a punchable sheet a slightly higher temperature range should be employed. Sheets exhibiting excellent punchable qualities are preferably subjected to heat in the temperature range of 200° F. to 1500° F. for a sufficiently long period of time to cause the temperature throughout the sheet to be relatively uniform. Some temperature variations may be tolerated. It has been found that an excellent sheet is produced if the curing temperature is applied for one to three minutes. As was stated above, when the sheet is subjected to temperatures above about 170 F., pressure should be applied in order to prevent the formation of voids due to gas bubbles. The amount of pressure may vary up to the compression strength of the mica platelets themselves but preferably the pressure is approximately 250 pounds per square inch. The preferred time for applying the pressure is at least equal to the time during which the impregnated sheet is being heated and, of course, preferably the heating and pressing operations are simultaneous.

The preferred temperature for making a punchable sheet falls within the range from 200° F. to 1500° F. and is preferably about 600° F. The necessary amount of time the heat is applied varies with the temperature employed. Satisfactory results will be obtained if heat is applied for one to three minutes. Moreover, at the temperatures preferably used to produce a punchable sheet, the sheet should be heated under pressure and preferably under pressure of the order of 250 p.s.i. If temperatures substantially above 600° F. are used, the sheet will not exhibit good punchable characteristics until it has been permitted to stand in a room or in a moist atmosphere for a sufficient time to pick up moisture from the surrounding atmosphere. It is to be noted that all sheets cured at temperatures of 1500° F. or below exhibit the property of picking up moisture and it appears that the presence of moisture in the sheet gives it the punchable characteristic discussed above. It has been found that the higher the temperature to which the sheet is subjected, the less is the tendency of the sheet to pick up moisture and the slower is the moisture picking up action. For instance, under normal humidity conditions in a room, a sheet subjected to 600° F. temperatures will pick up sufficient moisture upon being transferred from the furnace or mold to be immediately punched and it will exhibit excellent punchability. However, with sheets heated to 1500° F., the action of picking up moisture is slowed to the point where it becomes necessary to store the sheet either under standard room humidity conditions or in a high humidity atmosphere until the sheet picks up all the moisture it can, which is about 8% by weight. Once this moisture absorbing action has been completed the sheet will exhibit excellent punchable characteristics.

Regardless of whether the sheet has been treated for shaping and thereafter has been shaped or has been treated for punching and thereafter has been punched, it is extremely desirable to fully cure the phosphate binder in the sheet after shaping or punching thereof. Full curing of either type sheet may be effected by subjecting the sheet to temperatures of the order of 1600° F. to 2000° F., and preferably 1800° F., for sufficient time to substantially uniformly heat the sheet throughout. A small temperature variation of the order of 50° or so can be tolerated. As has been indicated heretofore, the reaction products yielded after application of heat above 1500° F. are different from those yielded below 1500° F. Above 1500° F. the reaction products formed below 1500° F. appear to vitrify and thus form a rigid sheet. After the sheet has been fully cured it no longer exhibits any tendency to pick up moisture, it is rigid and white and exhibits excellent electrical and thermal properties.

In accordance with one modification of the present invention, the partial curing of a sheet in accordance with the methods described above can be employed in order to achieve an extremely smooth surface on a fully cured sheet. When using a screen as a support in lieu of temporary organic binders, the sheet is normally pressed with the screen in intimate contact with the surface thereof. Accordingly, the partially cured sheet will have the cross-hatching of the supporting screen impressed therein. This cross-hatching appears to reinforce or strengthen the sheet. However, for certain applications, as for instance where the high reflectivity of the white synthetic fluor-phlogopite mica sheet is desired, it is preferable for the surfaces of the sheet to be absolutely smooth. This may be accomplished by partially curing the sheet at a temperature between room temperature and 450° F. under pressure preferably at 250 pounds per square inch and thereafter stripping the screen from the sheet. After the stripping of the screen, metal foil is laid over both surfaces of the sheet. One highly desirable foil for this purpose is molybdenum foil. After the foil is laid over the surfaces of the partially cured sheet, the sheet is reinserted into the press and is again subjected to suitable pressure, preferably of the order of 250 pounds per square inch, and is heated to a temperature of less than 1500° F. and preferably 600° F.

It is desirable not to press the sheet above 600° F. while disposed between the molybdenum foil as the molybdenum foil will cause a discoloration of the final product at temperatures greatly exceeding 600° F. After the sheet has been pressed between the molybdeum foil at a temperature of about 600° F. for about one to three minutes, the sheet and the foil are again removed from the press, the molybdenum foil is stripped from the sheet and the sheet is then placed in a furnace at a temperature of somewhere between 1600° F. and 2000° F. for firing. Preferably, the furnace temperature is about 1800° F. After the sheet has been fired at 1800° F., it may be removed therefrom and the final product will have hard smooth surfaces of great reflectivity.

While we have herein shown and described several forms of the present invention and have suggested a number of modifications therein, it will be understood that various changes and modifications may be made therein within the scope of the appended claims without departing from the spirit and scope of this invention.

Having now described our invention, what we claim as new and desire to secure by Letters Patent, is:

1. A method of making a phosphate bonded reconstituted micaceous sheet, comprising the steps of impregnating a reconstituted micaceous sheet with a solution containing phosphate ions therein, and permitting the phosphate ions to react with the micaceous material at a temperature below about 1500° F., then permitting said impregnated sheet to take up moisture, then working said sheet, and then firing said sheet at a temperature above about 1600° F.

2. A method of making a phosphate bonded reconstituted synthetic fluor-phlogopite mica sheet, comprising the steps of impregnating a reconstituted synthetic fluor-phlogopite mica sheet with a solution containing phosphate ions therein, permitting the phosphate ions to react with the synthetic fluor-phlogopite mica material at a temperature below about 1500° F., then permitting said impregnated sheet to take up moisture, then working said sheet, and then firing said sheet at a temperature above about 1600° F.

3. A method of making a phosphate bonded synthetic fluor-phlogopite mica sheet from a reconstituted sheet of fluor-phlogopite mica, comprising the steps of impregnating said reconstituted sheet with a solution varying in formulation between 1 part orthophosphoric acid and 50 parts solvent to pure orthophosphoric acid, and permitting the phosphate ions in said solution to react with said synthetic fluor-phlogopite mica at a temperature below about 1500° F., then permitting said impregnated sheet to take up moisture, then working said sheet, and then firing said sheet at a temperature above about 1600° F.

4. A method of making a phosphate bonded synthetic fluor-phlogopite mica sheet from a reconstituted sheet of fluor-phlogopite mica, comprising the steps of impregnating said reconstituted sheet with a solution consisting essentially of 1 part of 85% strength orthophosphoric acid to 8 parts of methyl alcohol, permitting the phosphate ions in said solution to react with said synthetic fluor-phlogopite mica at a temperature below about 1500° F., then permitting said impregnated sheet to take up moisture, then working said sheet, and then firing said sheet at a temperature above about 1600° F.

5. A method of making a punched phosphate bonded micaceous sheet from a reconstituted micaceous sheet, comprising the steps of impregnating said reconstituted sheet with a solution containing phosphate ions, heating said impregnated sheet to a temperature between about 200° F. and 1500° F. for enough time to permit the phosphate ions to react with the micaceous material, then permitting said impregnated sheet to take up moisture from the surrounding atmosphere, then punching said sheet, and then firing said sheet at a temperature between 1600° F. and 2000° F.

6. A method of making a punched phosphate bonded micaceous sheet from a reconstituted micaceous sheet, comprising the steps of impregnating said reconstituted sheet with a solution containing phosphate ions, heating said impregnated sheet to a temperature of about 600° F. while simultaneously applying pressure to said sheet, then permitting said impregnated sheet to take up moisture from the surrounding atmosphere, then punching said sheet, and then firing said sheet at a temperature of about 1800° F.

7. A method of making a punched phosphate bonded sheet from a reconstituted sheet of synthetic fluor-phlogopite mica, comprising the steps of disposing said reconstituted sheet on a stainless steel wire screen, transferring said sheet and screen into a binder solution consisting essentially of approximately 1 part of 85% strength orthophosphoric acid and 8 parts methyl alcohol by exerting a force only on said supporting screen, removing said screen and sheet from said binder solution, by exerting a force only on said screen, subjecting said sheet and screen to about 600° F. temperature while simultaneously compressing them under about 250 pounds per square inch pressure for about one to three minutes, stripping said screen from said sheet, permitting said sheet to pick up moisture, then punching said sheet, and then firing said sheet at about 1800° F.

8. A method of making a shaped phosphate bonded micaceous sheet from a reconstituted micaceous sheet, comprising the steps of impregnating said reconstituted sheet with a solution containing phosphate ions, heating said impregnated sheet to a temperature between room temperature and 450° F. for enough time to permit the phosphate ions to react with the micaceous material, permitting said sheet to pick up moisture, then shaping said sheet, and then firing said sheet at a temperature between 1600° F. and 2000° F.

9. A method of making a shaped phosphate bonded micaceous sheet from a reconstituted micaceous sheet, comprising the steps of impregnating said reconstituted sheet with a solution containing phosphate ions, heating said impregnated sheet to a temperature of about 250° F. to 300° F. while simultaneously applying pressure to said sheet for enough time to permit the phosphate ions to react with the micaceous material, permitting said sheet to pick up moisture, then shaping said sheet, and then firing said sheet at a temperature of about 1800° F.

10. A method of making a shaped phosphate bonded synthetic fluor-phlogopite mica sheet from a reconstituted sheet of synthetic fluoro-phlogopite mica, comprising the steps of disposing said reconstituted sheet on a stainless steel wire screen, transferring said sheet and screen into a binder solution consisting essentially of approximately 1 part of 85% strength orthophosphoric acid and 8 parts methyl alcohol by exerting a force only on said supporting screen, removing said screen and sheet from said binder solution by exerting a force only on said screen, subjecting said sheet and screen to a temperature between 250° F. and 300° F. while simultaneously compressing them under about 250 pounds per square inch pressure for about one to three minutes, stripping said screen from said sheet, permitting said sheet to pick up moisture, then shaping said sheet, and then firing said sheet at about 1800° F.

References Cited in the file of this patent

UNITED STATES PATENTS

| | | |
|---|---|---|
| 1,829,981 | Cooper | Nov. 3, 1931 |
| 2,196,974 | Boughton et al. | Apr. 16, 1940 |
| 2,341,637 | Mansfield | Feb. 15, 1944 |
| 2,542,827 | Minter | Feb. 20, 1951 |
| 2,704,261 | Comeforo | Mar. 15, 1955 |